United States Patent
Hough et al.

(10) Patent No.: US 10,533,453 B2
(45) Date of Patent: Jan. 14, 2020

(54) ENGINE COMPONENT HAVING PLATFORM WITH PASSAGEWAY

(71) Applicant: UNITED TECHNOLOGIES CORPORATION, Hartford, CT (US)

(72) Inventors: Matthew Andrew Hough, West Hartford, CT (US); Jeffrey S. Beattie, South Glastonbury, CT (US); Tracy A. Propheter-Hinckley, Manchester, CT (US); San Quach, East Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 404 days.

(21) Appl. No.: 14/910,551

(22) PCT Filed: Aug. 5, 2014

(86) PCT No.: PCT/US2014/049749
§ 371 (c)(1),
(2) Date: Feb. 5, 2016

(87) PCT Pub. No.: WO2015/053846
PCT Pub. Date: Apr. 16, 2015

(65) Prior Publication Data
US 2016/0177782 A1 Jun. 23, 2016

Related U.S. Application Data

(60) Provisional application No. 61/862,117, filed on Aug. 5, 2013.

(51) Int. Cl.
*F01D 25/12* (2006.01)
*F01D 5/18* (2006.01)
(Continued)

(52) U.S. Cl.
CPC ............... *F01D 25/12* (2013.01); *F01D 5/12* (2013.01); *F01D 5/187* (2013.01); *F01D 9/041* (2013.01);
(Continued)

(58) Field of Classification Search
None
See application file for complete search history.

(56) References Cited

U.S. PATENT DOCUMENTS 6,120,249 A 9/2000 Hultgren et al.
6,932,571 B2 * 8/2005 Cunha .................. F01D 5/18
416/97 R (Continued)

OTHER PUBLICATIONS

The International Preliminary Report on Patentability for PCT Application No. PCT/US2014/049749, dated Feb. 18, 2016.
(Continued)

*Primary Examiner* — Christopher Verdier
*Assistant Examiner* — Juan G Flores
(74) *Attorney, Agent, or Firm* — Carlson, Gaskey & Olds, P.C.

(57) ABSTRACT

One exemplary embodiment of this disclosure relates to a gas turbine engine including a component. The component includes a platform having a mateface on a circumferential side thereof. The platform including a core passageway configured to communicate fluid to the mateface.

17 Claims, 3 Drawing Sheets

(51) Int. Cl.
*F01D 5/12* (2006.01)
*F01D 9/04* (2006.01)
*F01D 11/08* (2006.01)
*F04D 29/32* (2006.01)
*F04D 29/38* (2006.01)
*F04D 29/54* (2006.01)
*F04D 29/58* (2006.01)
*F01D 11/00* (2006.01)

(52) U.S. Cl.
CPC ............ *F01D 11/08* (2013.01); *F04D 29/324* (2013.01); *F04D 29/38* (2013.01); *F04D 29/542* (2013.01); *F04D 29/582* (2013.01); *F01D 11/006* (2013.01); *F05D 2220/32* (2013.01); *F05D 2230/21* (2013.01); *F05D 2230/211* (2013.01); *F05D 2230/30* (2013.01); *F05D 2240/81* (2013.01); *F05D 2260/201* (2013.01); *F05D 2260/202* (2013.01); *F05D 2260/205* (2013.01); *F05D 2260/2212* (2013.01); *F05D 2300/13* (2013.01); *F05D 2300/20* (2013.01); *Y02T 50/676* (2013.01)

(56) References Cited

U.S. PATENT DOCUMENTS

| | | | | |
|---|---|---|---|---|
| 7,147,439 B2* | 12/2006 | Jacala | ........................ | F01D 5/08 |
| | | | | 416/97 R |
| 7,255,536 B2* | 8/2007 | Cunha | ........................ | F01D 9/02 |
| | | | | 416/193 A |
| 7,416,391 B2* | 8/2008 | Veltre | ...................... | F01D 5/187 |
| | | | | 416/193 A |
| 8,734,108 B1* | 5/2014 | Liang | ........................ | F01D 5/189 |
| | | | | 416/96 A |
| 8,734,111 B2* | 5/2014 | Lomas | .................... | F01D 5/187 |
| | | | | 416/193 A |
| 8,814,518 B2* | 8/2014 | Harris, Jr. | ............... | F01D 5/081 |
| | | | | 29/557 |
| 8,851,846 B2* | 10/2014 | Ellis | ........................ | F01D 5/081 |
| | | | | 416/193 A |
| 9,249,674 B2* | 2/2016 | Ellis | ........................ | F01D 5/187 |
| 2004/0151587 A1* | 8/2004 | Cunha | ........................ | F01D 5/18 |
| | | | | 416/97 R |
| 2006/0263221 A1* | 11/2006 | Cunha | ........................ | F01D 9/02 |
| | | | | 416/193 A |
| 2006/0269409 A1 | 11/2006 | Torii et al. | | |
| 2007/0201979 A1* | 8/2007 | Veltre | ...................... | F01D 5/187 |
| | | | | 416/97 R |
| 2010/0239432 A1 | 9/2010 | Liang | | |
| 2010/0329888 A1 | 12/2010 | Nadvit et al. | | |
| 2011/0123310 A1 | 5/2011 | Beattie et al. | | |
| 2012/0082550 A1 | 4/2012 | Harris, Jr. et al. | | |
| 2012/0082564 A1* | 4/2012 | Ellis | ........................ | F01D 5/081 |
| | | | | 416/97 R |
| 2012/0082566 A1 | 4/2012 | Ellis et al. | | |
| 2012/0107134 A1* | 5/2012 | Harris, Jr. | ............... | F01D 5/081 |
| | | | | 416/97 R |
| 2012/0107234 A1 | 5/2012 | Harris, Jr. et al. | | |
| 2012/0328451 A1* | 12/2012 | Lomas | .................... | F01D 5/187 |
| | | | | 416/97 R |
| 2013/0115101 A1 | 5/2013 | Walunj et al. | | |
| 2013/0171004 A1* | 7/2013 | Ellis | ........................ | F01D 5/187 |
| | | | | 416/97 R |
| 2014/0064984 A1* | 3/2014 | Zhang | .................... | F01D 5/187 |
| | | | | 416/97 R |

OTHER PUBLICATIONS

International Search Report and Written Opinion for PCT/US2014/049749 dated Apr. 17, 2015.

European Search Report for European Patent Application No. 14852521.5 completed Mar. 30, 2017.

* cited by examiner

ENGINE COMPONENT HAVING PLATFORM WITH PASSAGEWAY

GOVERNMENT CONTRACT

This invention was made with government support under Contract No. N00019-12-D-0002 awarded by the United States Navy. The government has certain rights in this invention.

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. Turbine blades are known to include an airfoil section, over which the hot combustion gases flow, and a root attached to a rotatable disc.

A support, or platform, is typically rigidly attached (e.g., bolted) adjacent to the turbine blade near the root, or is integrally formed with the turbine blade (e.g., by casting or molding). These platforms are known to include cooling passageways formed therein to protect the platform from the hot combustion gases.

SUMMARY

One exemplary embodiment of this disclosure relates to a gas turbine engine including a component. The component includes a platform having a mateface on a circumferential side thereof. The platform includes a core passageway configured to communicate fluid to the mateface.

In a further embodiment of any of the above, the core passageway includes a plurality of pedestals extending between a radially inner and a radially outer boundary of the core passageway.

In a further embodiment of any of the above, the core passageway divides into a plurality of finger passages that open to a plurality of mateface exits.

In a further embodiment of any of the above, the mateface exits are non-circular.

In a further embodiment of any of the above, the mateface exits are rectangular in cross section.

In a further embodiment of any of the above, the core passageway is connected with a main body core passageway of the gas turbine engine component.

In a further embodiment of any of the above, the core passageway includes a single inlet and a plurality of exits.

In a further embodiment of any of the above, the core passageway is provided with a flow of fluid from one of a pocket radially below the platform and leading edge rim cavity of the gas turbine engine component.

In a further embodiment of any of the above, the core passageway is formed when forming the component by one of investment casting and additive manufacturing.

Another exemplary embodiment of this disclosure relates to gas turbine engine component including a platform. The platform has a mateface on a circumferential side thereof. The platform includes a core passageway configured to communicate a fluid to the mateface.

In a further embodiment of any of the above, the core passageway includes a plurality of pedestals extending between a radially inner and a radially outer boundary of the core passageway.

In a further embodiment of any of the above, the core passageway is configured to communicate fluid within the platform to a plurality of mateface exits.

An exemplary method according to this disclosure includes forming a core passageway in a platform of the gas turbine engine component. The core passageway is configured to communicate fluid to a mateface of the platform.

In a further embodiment of any of the above, the forming step includes investment casting.

In a further embodiment of any of the above, the method includes inserting a core insert into a wax pattern, the core insert corresponding to the shape of the core passageway.

In a further embodiment of any of the above, the core insert includes a plurality of openings corresponding to mateface exits, and a plurality of openings corresponding to pedestals within the core passageway.

In a further embodiment of any of the above, the method includes removing the core insert after the workpiece is cast.

In a further embodiment of any of the above, the core insert includes at least one of a ceramic and a refractory metal core (RMC).

In a further embodiment of any of the above, the forming step includes additive manufacturing.

In a further embodiment of any of the above, the gas turbine engine component is a blade.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
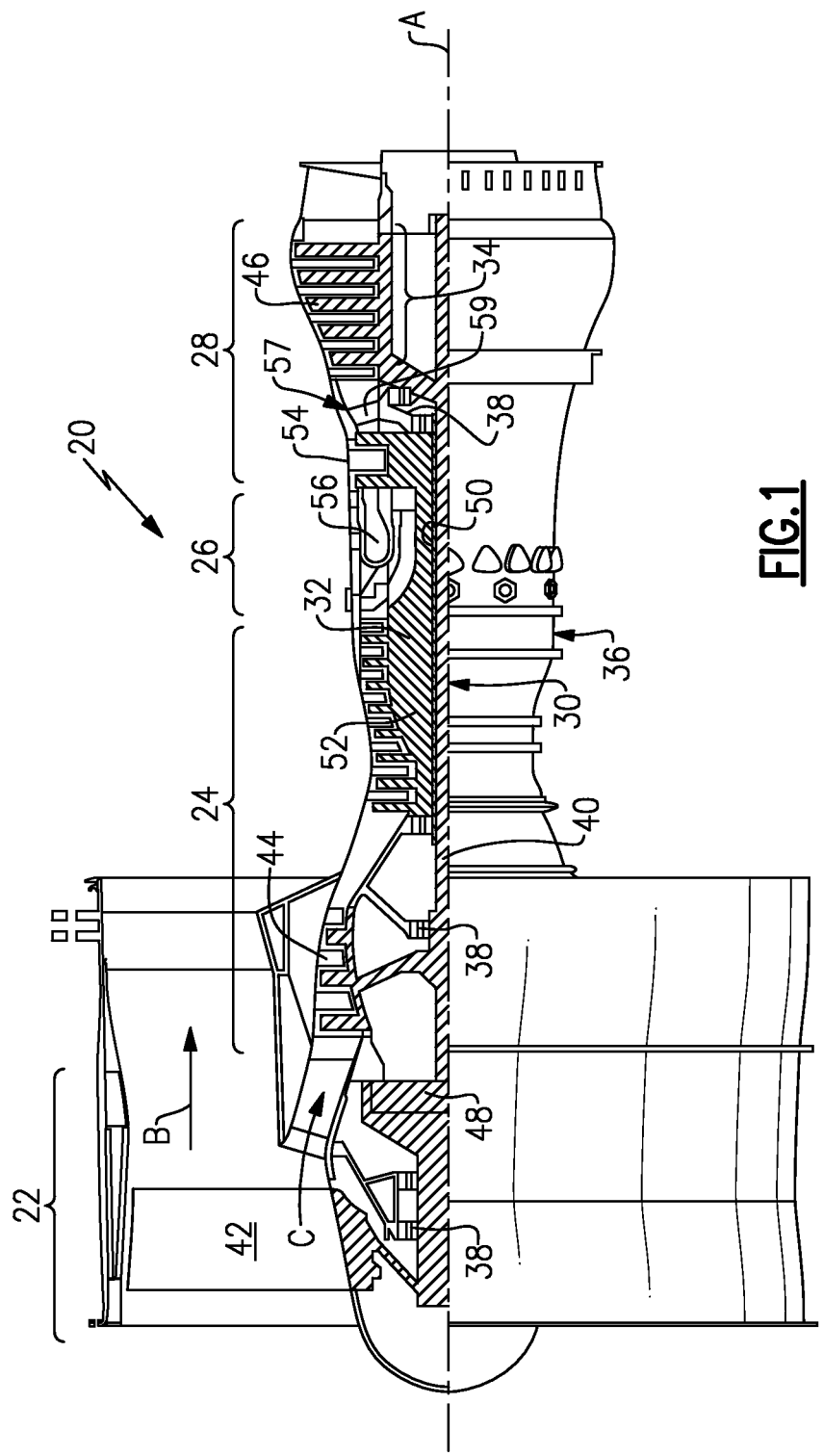
FIG. 1 schematically illustrates a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed," as disclosed herein according to one non-limiting embodiment, is less than about 1150 ft/second.

Figure 2:
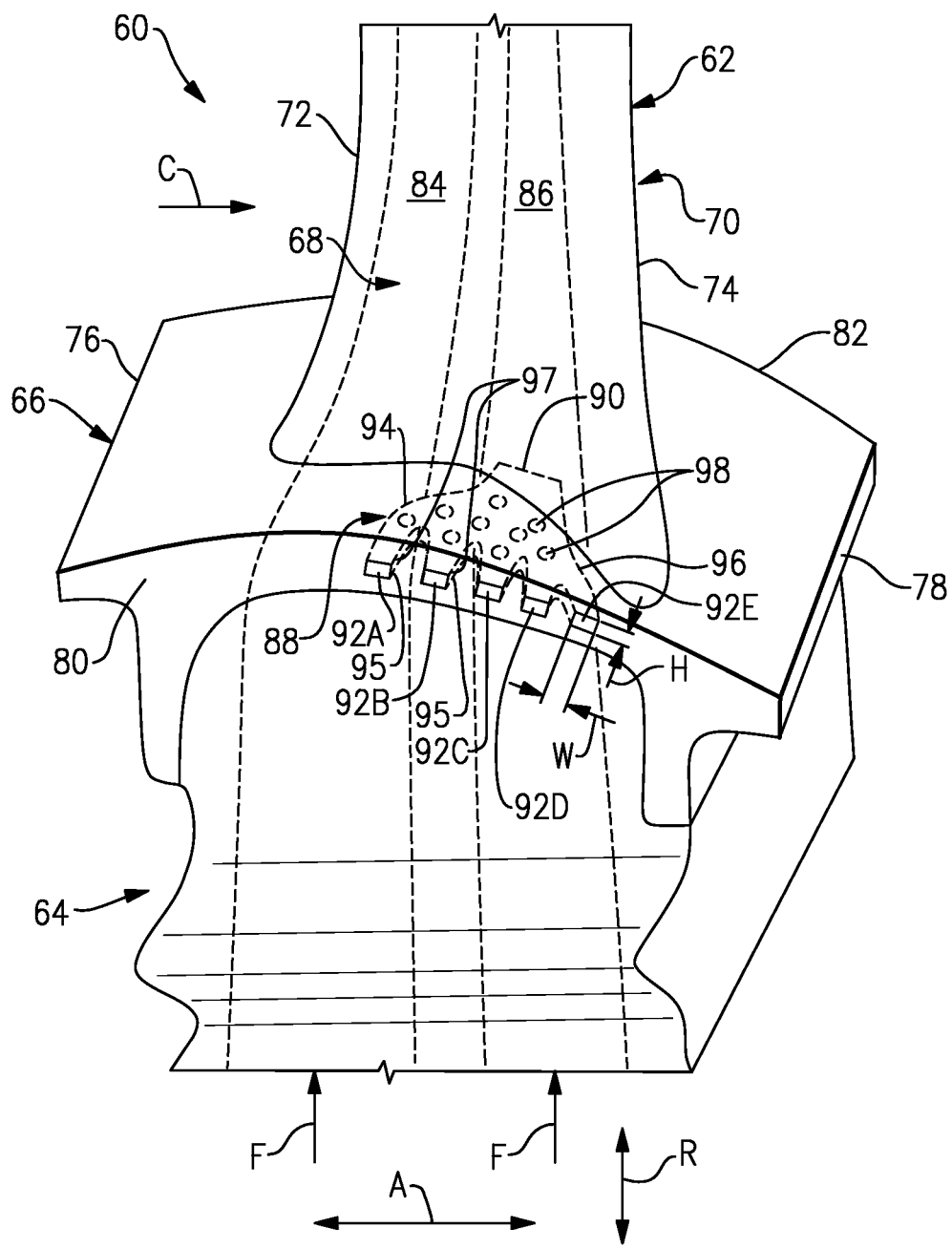
FIG. 2 is a perspective view of a turbine blade according to this disclosure.
Figure 3:
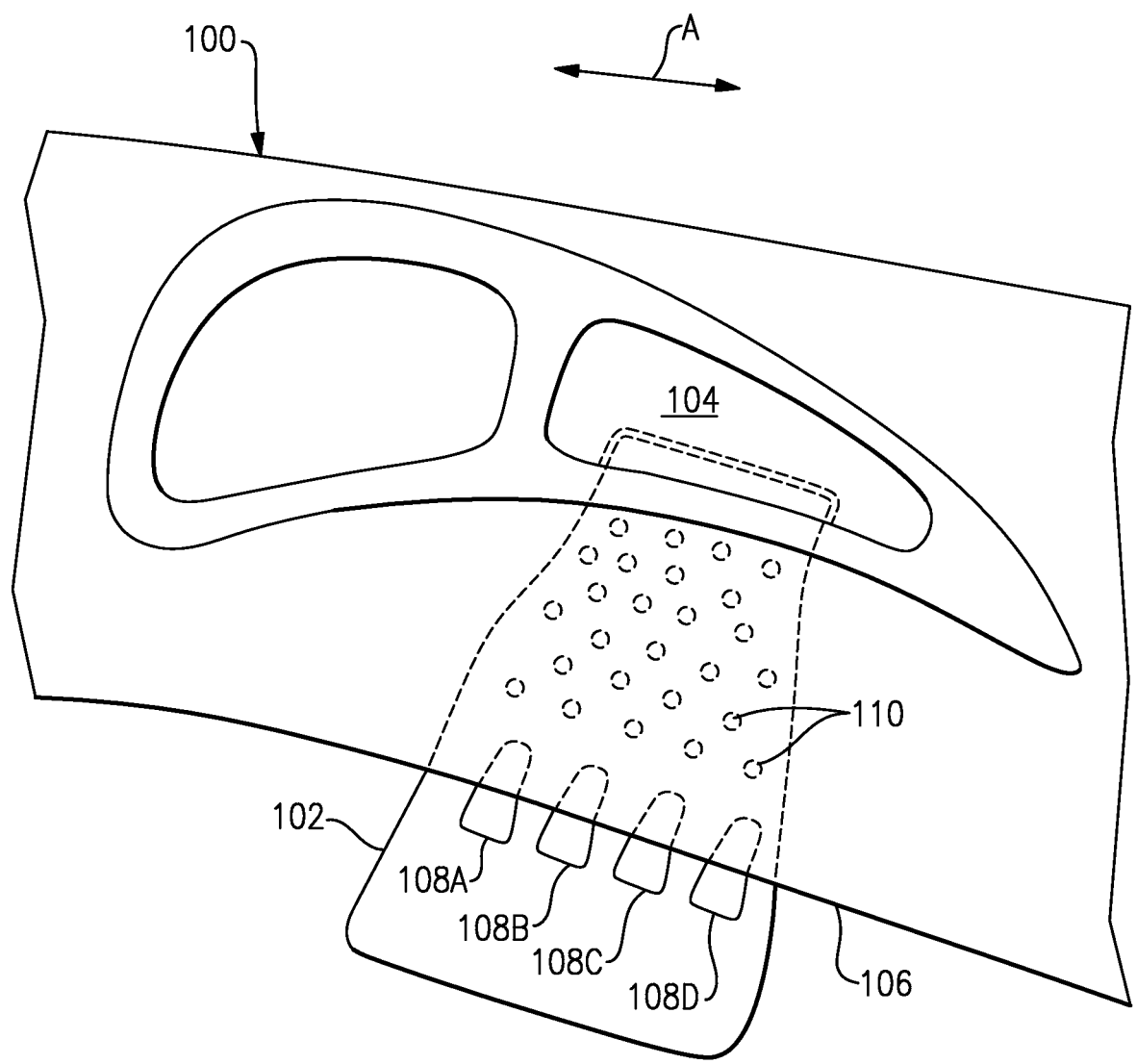
FIG. 3 is a top view illustrating a core insert according to this disclosure.

FIGS. 2-3 show an example component 60. In this example, the component 60 is a turbine blade. It should be understood, however, that this disclosure could apply to compressor blades, as well as stator vanes, fan blades, and blade outer air seals (BOAS).

The component 60 includes an airfoil section 62, a root 64, and a support, here a platform, 66. In this example, the root 64 is a fir-tree root. Other example roots, such as dovetail roots, could be used, however. The airfoil section 62 includes a pressure side 68 and an opposed suction side 70 provided between a leading edge 72 and a trailing edge 74. The platform 66 similarly includes a leading edge 76, a trailing edge 78, and matefaces 80, 82 at circumferentially opposed sides thereof. The matefaces 80, 82 are configured to circumferentially abut matefaces of a similar, adjacent component to provide a boundary for the hot gases flowing in the core flow path C.

The component 60 includes a pair of main body core passages 84, 86 to communicate a flow of fluid F through the airfoil section 62 of the component 60 in a radial direction R, which is normal to the engine central longitudinal axis A. The main body core passages 84, 86 communicate fluid F within the component 60 for cooling.

In this example, a core passageway 88 is provided in the platform 66. The core passageway 88 is in communication with at least one of the main body core passages 84, 86 to communicate a portion of the flow of fluid F to one of the matefaces 80, 82. In this example, the core passageway 88 is provided within the platform 66, and communicates a portion of the fluid F from the main body core passageway 86 to a plurality of mateface exits 92A-92E.

The core passageway 88 in this example includes an inlet 90 and a plurality of finger passages that open to a plurality of mateface exits 92A-92E. While there are five mateface exits 92A-92E in the illustrated embodiment, it should be understood that the component 60 include any number of mateface exits.

In this example, the mateface exits 92A-92E are non-circular. In particular, the illustrated mateface exits 92A-92E are rectangular in cross-section when viewed from the side of the mateface 80 (e.g., from the perspective illustrated in FIG. 2). The mateface exits 92A-92E each include a height H, and a width W that is greater than the height H. This provides a relatively flat exit passageway, which provides an increased surface area for cooling. While a rectangular shape is illustrated, it should be understood that other shapes come within the scope of this disclosure.

The core passageway 88 includes a leading boundary 94, and a trailing boundary 96. The core passageway 88 is relatively flat in that it extends substantially further between the leading and trailing boundaries 94, 96 than between radially inner and radially outer boundaries 95, 97 thereof. The height of the core passageway 88 between the radially inner and outer boundaries 95, 97 is substantially equal to the height H. The relatively flat arrangement of the core passageway 88, again, provides for increased heat transfer. The multiple exit passageways 92A-92E facilitate the relatively flat arrangement of the core passageway.

A plurality of pedestals 98 are provided between the leading and trailing boundaries 94, 96 to increase an internal heat transfer coefficient and aid in the cooling of the platform 66. In this example, the pedestals 98 are generally cylindrical and extend from the radially inner boundary 95 of the core passageway 88 to the radial outer boundary 97 of the core passageway 88. It should be understood that the pedestals 98 need not be cylindrical, and other shapes can be used herein.

During operation, the main body core passageways 84, 86 are provided with a flow of fluid F, a portion of which is diverted into the core passageway 88. The fluid within the core passageway cools the platform 66 as it passes therethrough. The fluid further cools the mateface 80 as it exits the mateface exits 92A-92E. The fluid further creates a boundary at the mateface 80 reducing leakage of the fluid out of the core flow path C. The fluid exiting the mateface exits 92A-92E may flow into the core flow path C in one example, or may be directed to another location in the engine 20.

While in the illustrated example the source of fluid F is the main body core passageways 84, 86, the core passageway 88 could be provided with a source of fluid from another location. For instance, the fluid F could be sourced from blade pockets radially below the platform 66, or from the leading edge of a blade rim cavity, as examples. As another example, the fluid F could be sourced from the central underplatform.

This disclosure thus provides effective cooling of the blade platform 66, as well as an increased fluid boundary between the matefaces of adjacent blades (e.g., to reduce leakage of the fluid out of the core flow path C).

Further, as will be discussed in detail below, the core passageway 88 may be formed by way of additive manufacturing or investment casting. In either case, the core passageway 88 can include any number of contours, shapes, and structures for increased heat transfer. This adaptability is especially beneficial when the matefaces 80, 82 include contours that are not obtainable using machining techniques (such as drilling). The core passageway 88 can further be formed without additional, post-fabrication machining steps, such as drilling (and the associated cleanup), which reduces the time and cost of manufacturing.

As mentioned above, the core passageway 88 may be formed using additive manufacturing or investment casting. Turning to FIG. 3, in the example where the core passageway 88 is formed by investment casting, a wax pattern 100 of the component 60 is formed. In this example, a core insert 102 is provided into the wax pattern 100 and is intended to remain part of the wax pattern 100 until the component 60 is cast. In this example, the core insert 102 extends from a portion 104 of the wax pattern 100 representing the main body core passageway 86 to a portion 106 representing the mateface 80.

The core insert 102 includes a plurality of exit openings 108A-108D corresponding to the spaces between the mateface exits 92A-92E, which define the finger passages leading to the mateface exits 92A-92E. The core passageway insert 102 further includes a plurality of pedestal openings 110 configured to be filled with material to form the pedestals 98.

The core passageway insert 102 in this example is a ceramic insert. In another embodiment, the core passageway insert 102 is a refractory metal core (RMC). It should be understood that other materials may be used. Further, the core passageway insert 102 may itself be formed by way of additive manufacturing, to provide the level of detail required for the openings 108A-108D, 110. Alternatively, the core passageway insert 102 may be cast.

While FIG. 2 illustrates a single core passageway 88 in the platform 66, it should be understood that additional core passageways can be provided in the platform 66. Further, the illustrated embodiment of the core passageway 88 should not be considered limiting. The core passageway 88 can be modified to route fluid throughout the platform 66, and to exits provided in areas other than the matefaces 80, 82. For instance, the core passageway 88 could also include exits at the trailing edge 78.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a component including a platform having a mateface on a circumferential side thereof, the platform including a core passageway configured to communicate fluid to the mateface,
   wherein the core passageway includes a plurality of pedestals extending between a radially inner and a radially outer boundary of the core passageway, and
   wherein the core passageway opens to a plurality of non-circular mateface exits, wherein the mateface exits are rectangular in cross section and have a width greater than a height, the height extending in a direction substantially normal to an engine central longitudinal axis, wherein the core passageway has a height substantially equal to the height of the mateface exits.

2. The gas turbine engine as recited in claim 1, wherein the core passageway divides into a plurality of finger passages that open to a respective one of the mateface exits.

3. The gas turbine engine as recited in claim 1, wherein the core passageway is connected with a main body core passageway of the gas turbine engine component.

4. The gas turbine engine as recited in claim 3, wherein the core passageway includes a single inlet and a plurality of exits.

5. The gas turbine engine as recited in claim 1, wherein the core passageway is provided with a flow of fluid from one of a pocket radially below the platform, a rim cavity of the gas turbine engine component, and a central underplatform portion of the gas turbine engine component.

6. The gas turbine engine as recited in claim 1, wherein the core passageway is formed when forming the component by one of investment casting and additive manufacturing.

7. The gas turbine engine as recited in claim 1, wherein the core passageway is configured such that all fluid flowing into the core passageway exits through the mateface exits.

8. The gas turbine engine as recited in claim 1, wherein the width of the mateface exits is less than a width of the core passageway.

9. The gas turbine engine as recited in claim 1, wherein the height of the core passageway along an entirety of the core passageway is substantially equal to the height of the mateface exits.

10. A gas turbine engine component, comprising:
a platform having a mateface on a circumferential side thereof, the platform including a core passageway configured to communicate a fluid to the mateface,
wherein the core passageway includes a plurality of pedestals extending between a radially inner and a radially outer boundary of the core passageway, and
wherein the core passageway opens to a plurality of non-circular mateface exits, and wherein the mateface defines the entirety of a perimeter of each of the mateface exits wherein the mateface exits are rectangular in cross section and have a width greater than a height, and wherein the core passageway has a height substantially equal to the height of the mateface exits.

11. The gas turbine engine component as recited in claim 10, wherein a width of the mateface exits is less than a width of the core passageway.

12. A method of forming a gas turbine engine component, comprising:
forming a core passageway in a platform of the gas turbine engine component, the core passageway configured to communicate fluid to a mateface of the platform, wherein the forming step includes investment casting and further includes inserting a core insert into a wax pattern, the core insert corresponding to the shape of the core passageway, wherein the core insert includes a plurality of openings configured to define non-circular mateface exits, each mateface exit having a rectangular cross-section with a width greater than a height, and a plurality of openings configured to define pedestals within the core passageway, wherein the core passageway has a height substantially equal to the height of the mateface exits.

13. The method as recited in claim 12, including removing the core insert after the gas turbine engine component is cast.

14. The method as recited in claim 12, wherein the core insert includes at least one of a ceramic and a refractory metal core (RMC).

15. The method as recited in claim 12, wherein the gas turbine engine component is a blade.

16. The method as recited in claim 12, wherein the core insert is arranged relative to the wax pattern such that all fluid flowing into the core passageway will exit through the mateface exits.

17. The method as recited in claim 12, wherein the core insert is arranged relative to the wax pattern such that the matefaces will define the entirety of a perimeter of each of the mateface exits.

\* \* \* \* \*